United States Patent
Phely et al.

(10) Patent No.: US 10,207,543 B2
(45) Date of Patent: Feb. 19, 2019

(54) SEMI-HOLLOW TIRE WITH SPECIFIED PROFILE AND ROLLING MEMBER EQUIPPED WITH PLURALITY OF SUCH TIRES

(71) Applicant: OTICO, Chalmaison (FR)

(72) Inventors: Olivier Phely, Thenisy (FR); Denis Piou, Villeblevin (FR)

(73) Assignee: OTICO, Chalmaison (FR)

( * ) Notice: Subject to any disclaimer, the term of this patent is extended or adjusted under 35 U.S.C. 154(b) by 277 days.

(21) Appl. No.: 14/073,172

(22) Filed: Nov. 6, 2013

(65) Prior Publication Data
US 2014/0124112 A1 May 8, 2014

(30) Foreign Application Priority Data

Nov. 7, 2012 (FR) ...................................... 12 02979

(51) Int. Cl.
*A01B 29/04* (2006.01)
*A01C 5/06* (2006.01)
(Continued)

(52) U.S. Cl.
CPC .............. *B60C 5/12* (2013.01); *A01B 29/043* (2013.01); *B60C 3/00* (2013.01); *B60C 3/02* (2013.01);
(Continued)

(58) Field of Classification Search
CPC .... B60C 3/00; B60C 3/02; B60C 3/04; B60C 3/08; B60C 5/008; B60C 5/01;
(Continued)

(56) References Cited

U.S. PATENT DOCUMENTS 595,422 A * 12/1897 Van Zandt ................ 152/522 X
597,569 A * 1/1898 Van Zandt ................ 152/453 X
(Continued)

FOREIGN PATENT DOCUMENTS

DE          36 12 881 A1 * 11/1986
DE    10 2004 007 601        9/2005
(Continued)

OTHER PUBLICATIONS

Preliminary Search Report dated May 21, 2013, in French Patent Application No. 12/02979, filed Nov. 7, 2012 (with English translation of category).

*Primary Examiner* — Adrienne C. Johnstone
(74) *Attorney, Agent, or Firm* — Oblon, McClelland, Maier & Neustadt, L.L.P.

(57) ABSTRACT

Pneumatic tire 1 for an agricultural machine, having an axis of revolution XX and comprising a tread 7, a sole 11 situated opposite the tread 7, and two sidewalls 13, 15 connecting the tread 7 to the sole 11. The tread 7, the sole 11 and the two sidewalls 13, 15 together form a casing 17 defining a chamber 19 inside the pneumatic tire 1. At least one of the sidewalls 13, 15 comprises, in this order and in succession in a direction oriented radially from the axis of revolution XX to the outside, a proximal portion 131, an intermediate portion 133 and a distal portion 135. In the unloaded state, the intermediate portion 133 projects into the chamber 19 in a direction substantially parallel to the axis of revolution XX.

16 Claims, 8 Drawing Sheets

(51) Int. Cl.
*B60C 3/00* (2006.01)
*B60C 3/02* (2006.01)
*B60C 7/10* (2006.01)
*B60C 7/12* (2006.01)
*B60C 13/02* (2006.01)
*B60C 5/12* (2006.01)
*B60C 13/00* (2006.01)
*B60C 7/14* (2006.01)
*B60C 11/03* (2006.01)
*B60C 7/24* (2006.01)
*B60C 17/00* (2006.01)

(52) U.S. Cl.
CPC ............... *B60C 7/10* (2013.01); *B60C 7/125* (2013.01); *B60C 7/143* (2013.01); *B60C 7/24* (2013.01); *B60C 11/0311* (2013.01); *B60C 13/003* (2013.01); *B60C 13/02* (2013.01); *B60C 17/009* (2013.01); *A01C 5/068* (2013.01); *B60C 2200/08* (2013.01); *Y10T 152/10495* (2015.01)

(58) Field of Classification Search
CPC .. B60C 7/10; B60C 7/12; B60C 7/125; B60C 13/003; B60C 13/004; B60C 13/009; B60C 13/02; B60C 2013/026; B60C 15/0233; B60C 17/00; B60C 17/009; B60C 17/08; B60C 19/04; B60C 2200/08; B60C 2007/005; B60C 7/102; B60C 7/00; B60C 7/143; A01B 29/043; A01B 29/04; A01B 29/041; Y10T 152/10144; Y10T 152/10153; Y10T 152/10162; A01C 5/068
USPC ............... 172/519, 537, 538; 152/155–157, 152/159–166, 192–195, 323, 325, 327, 152/452–454, 457, 514–516, 522, 523, 152/393–395, 328, 329, 324, 326, 376, 152/300, 301
See application file for complete search history.

(56) References Cited

U.S. PATENT DOCUMENTS

| | | | | | |
|---|---|---|---|---|---|
| 600,781 | A | * | 3/1898 | Gunther | B60C 7/10 152/159 |
| 799,638 | A | * | 9/1905 | Ducasble | 152/325 X |
| 1,079,515 | A | * | 11/1913 | Rondeau | 152/325 X |
| 1,185,986 | A | * | 6/1916 | Collins | 152/156 |
| 1,194,120 | A | * | 8/1916 | Bahen | 152/329 X |
| 1,316,773 | A | * | 9/1919 | Daigre | B60C 7/12 152/327 X |
| 1,416,303 | A | * | 5/1922 | Peck | B60C 7/12 152/327 X |
| 1,493,922 | A | * | 5/1924 | Deister | B60C 7/12 152/325 |
| 1,503,432 | A | * | 7/1924 | Schragin | 152/328 X |
| 1,862,269 | A | * | 6/1932 | Johnson | B60C 3/02 152/523 X |
| 2,375,992 | A | * | 5/1945 | Hoy | 152/156 |
| 2,601,464 | A | * | 6/1952 | Tanke | B60C 7/12 152/327 |
| 3,977,454 | A | * | 8/1976 | Coran | 152/323 |
| 4,061,171 | A | * | 12/1977 | Boileau | B60C 3/04 152/452 |
| 4,313,482 | A | * | 2/1982 | Vente | B60C 17/08 152/452 X |
| 4,493,355 | A | * | 1/1985 | Ippen | B60O 7/12 152/393 X |
| 5,499,669 | A | * | 3/1996 | Hardesty | B60C 3/02 152/325 X |
| 2008/0318747 | A1 | * | 12/2008 | Phely | A01B 29/043 |

FOREIGN PATENT DOCUMENTS

| | | | |
|---|---|---|---|
| DE | 10 2005 044 354 | | 3/2006 |
| EP | 0 076 412 A2 | * | 4/1983 |
| EP | 0 160 612 A2 | * | 11/1985 |
| EP | 0 173 670 | | 3/1986 |
| EP | 0 401 592 | | 12/1990 |
| EP | 1 361 078 | | 11/2003 |
| EP | 1 380 198 | | 1/2004 |
| FR | 409 854 | | 5/1910 |
| FR | 2 763 279 | | 11/1998 |
| FR | 2 776 239 | | 9/1999 |
| FR | 2 933 903 | | 1/2010 |
| GB | 2 071 027 A | * | 9/1981 |
| JP | 59084607 A | * | 5/1984 |
| JP | 2001121929 A | * | 5/2001 |
| JP | 2002154302 A | * | 5/2002 |
| JP | 2003136921 A | * | 5/2003 |
| JP | 2012051437 A | * | 3/2012 |
| WO | WO-2013/014676 A1 | * | 1/2013 |

* cited by examiner

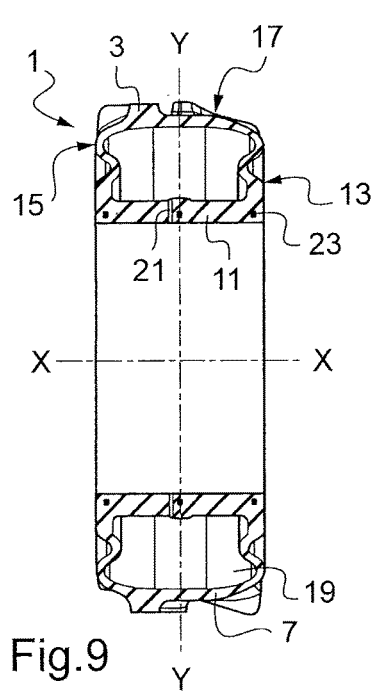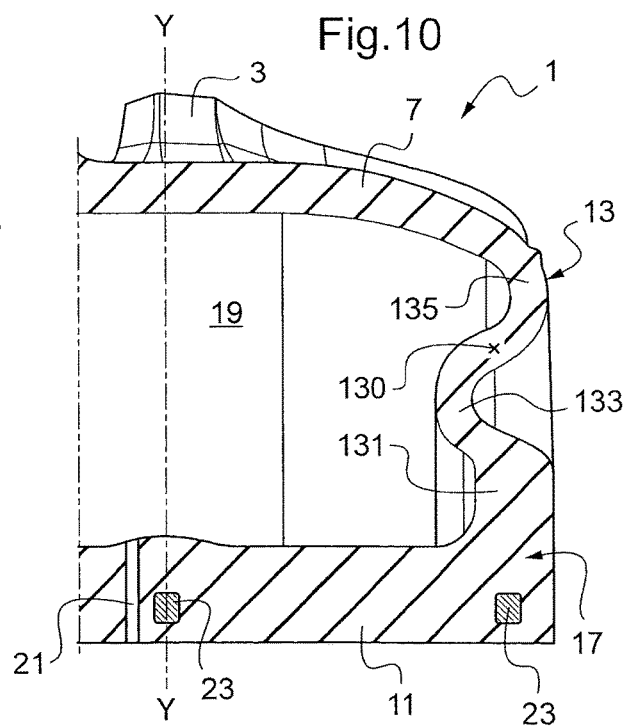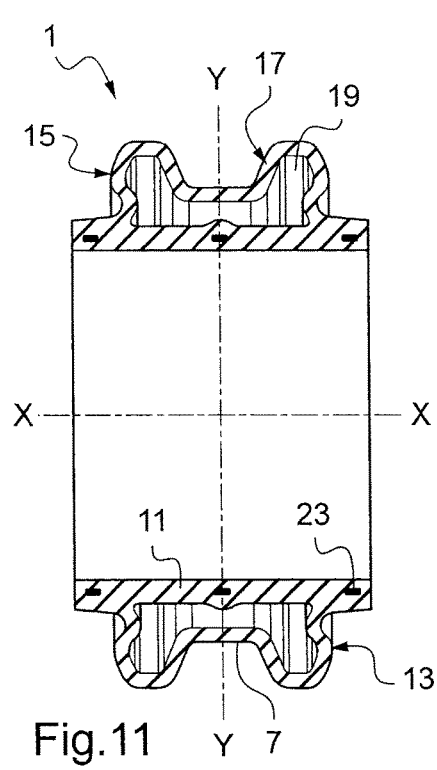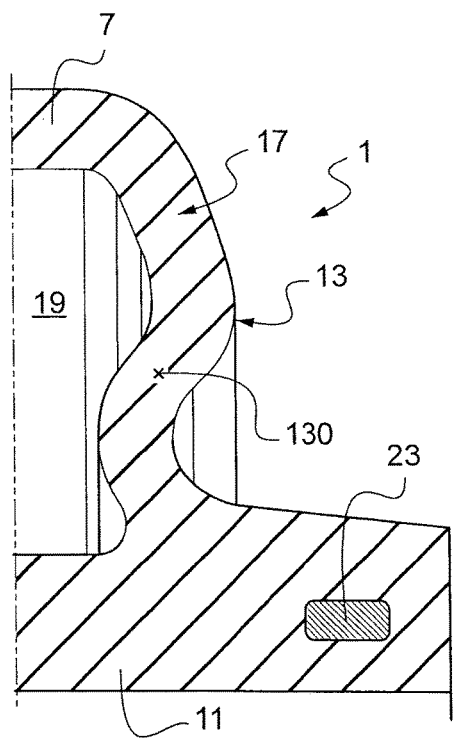

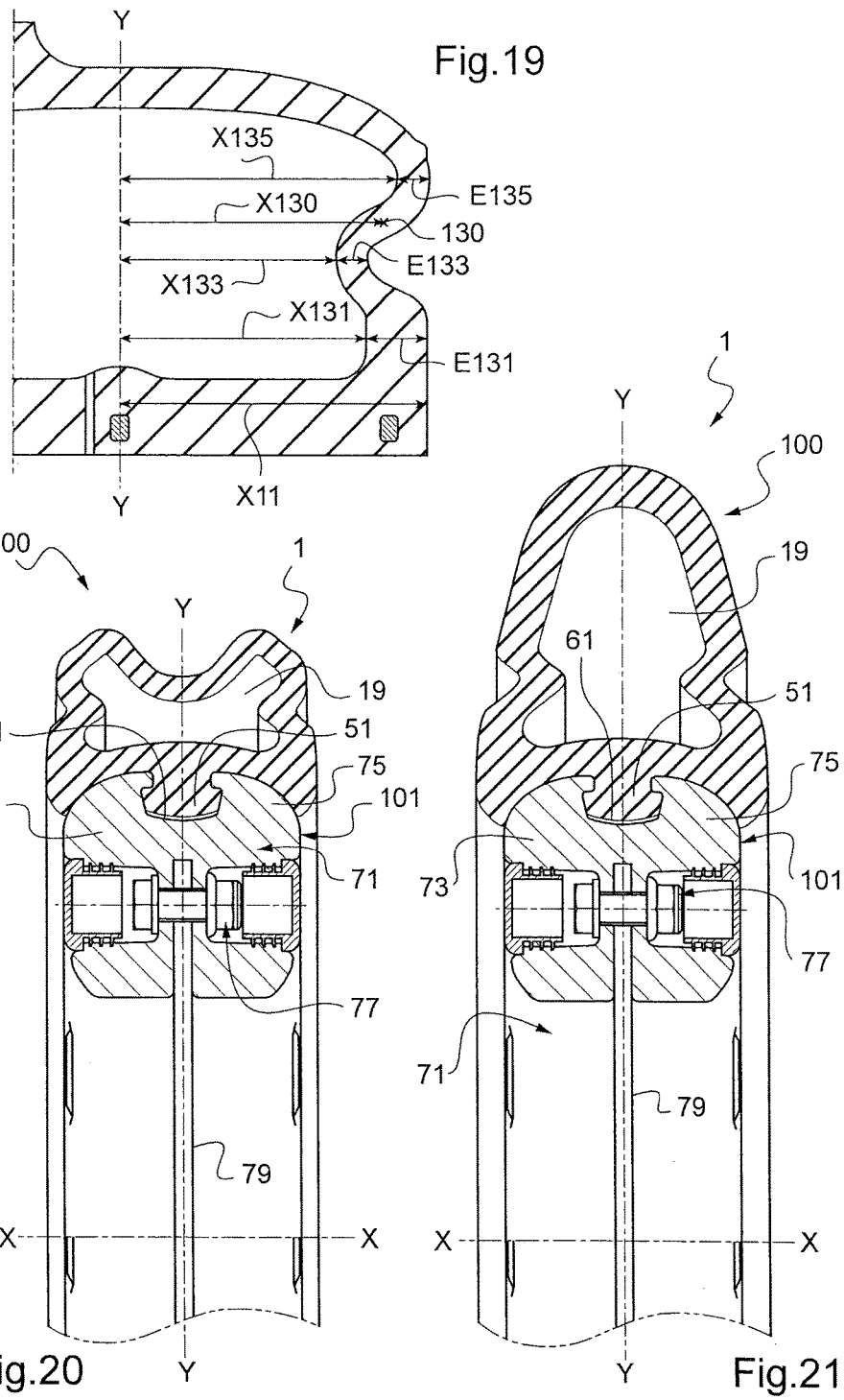

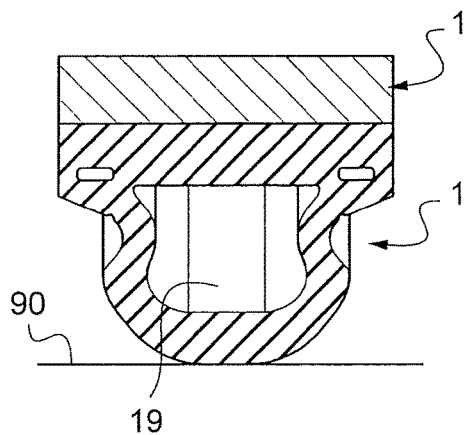
Fig.22
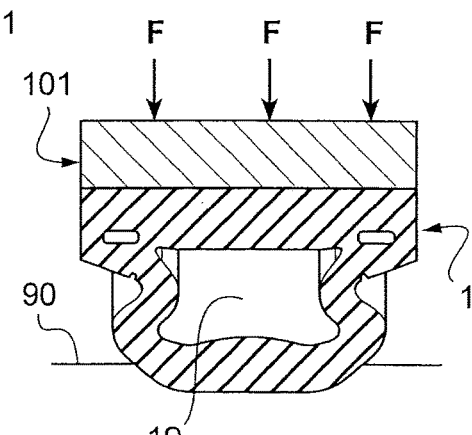
Fig.23
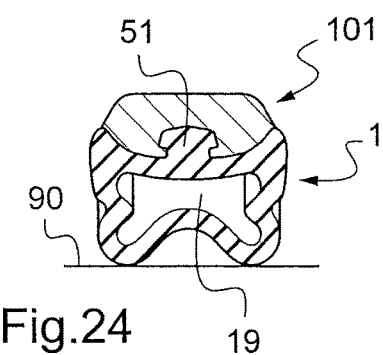
Fig.24
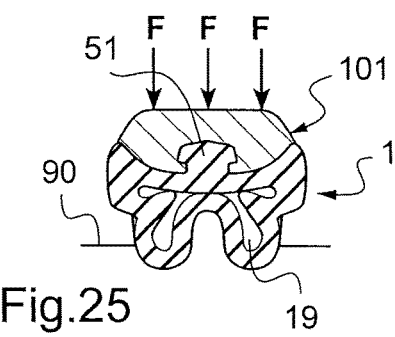
Fig.25
Fig.26
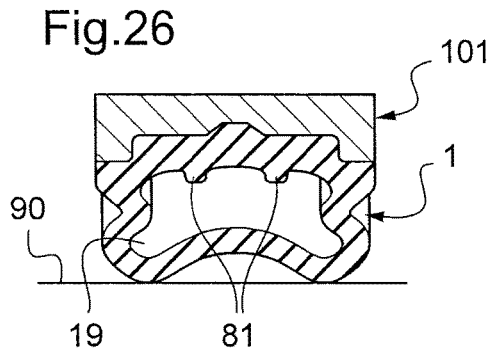
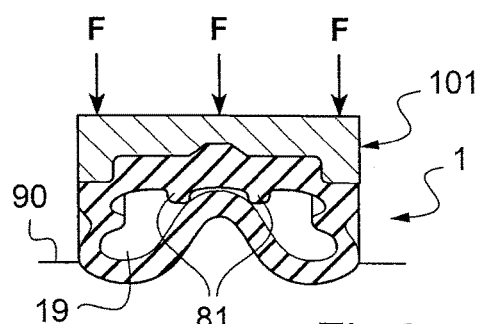
Fig.27

SEMI-HOLLOW TIRE WITH SPECIFIED PROFILE AND ROLLING MEMBER EQUIPPED WITH PLURALITY OF SUCH TIRES

BACKGROUND OF THE INVENTION

Field Of The Invention

The invention relates to a semi-hollow tire and to a wheel or roller carrying such tires allowing the land to be worked.

Discussion Of The Background

Agricultural equipment, such as machines combining wheels, rollers, sowers, soil preparing tools, etc., is often equipped with special tires. Among these tires, some are in the form of tires of the semi-hollow type. Semi-hollow tires, also called semi-hollow pneumatic tires, are tires the casing of which is not inflated. Semi-hollow tires are generally capable of being fitted to a cylindrical structure and abutting one another. Such pneumatic tires are described, for example, in French patent application FR 2 763 279. These tires can also be mounted individually on wheel rims, as described, for example, in FR 2 933 903.

This type of tire is satisfactory. Nevertheless, under certain working conditions, sticky soil, wet soil or mud tend to dirty the equipment and reduce its effectiveness. In order to clean the tires during use, it is known to use metal scrapers. The metal scrapers are of a shape complementary to that of the tires and are integral with the frame. The applicant has found that the presence of such scrapers increases the risk of damage to and perforation of the tires. In the event of accidental contact between the scrapers and the tires, or in the presence of a stone, for example, the tires can be damaged. The applicant has therefore sought to reduce these risks.

SUMMARY OF THE INVENTION

The applicant has designed pneumatic tires of the semi-hollow type, the self-cleaning properties of which allow scrapers to be dispensed with. The profiles of the pneumatic tires are particularly adapted so that the tread retains its functional shape during operation while the sidewalls exhibit considerable deformation. The tread during operation exhibits a movement in the radial direction due to the compression of the tire under the weight of the agricultural machine. This movement is not necessarily accompanied by a considerable deformation of the shape of the tread. The radial displacement of the tread improves the detachment of the soil without neutralizing the effectiveness of the agricultural machine.

Some manufacturers of semi-hollow tires have sought to limit the radial compression of the tires, for example by stiffening a significant portion of the sidewalls. Such tires are described, for example, in European patent application EP 0 401 592. The applicant has gone against this a priori and proposes tires in which the deformation of the sidewalls during operation is increased in a controlled manner.

To that end, the invention proposes a tire for an agricultural machine, having an axis of revolution and comprising a tread, a sole situated opposite the tread, and two sidewalls connecting the tread to the sole. The tread, the sole and the two sidewalls together form a casing which defines a chamber inside the tire. At least one of the sidewalls comprises, in this order and in succession in a direction oriented radially from the axis of revolution to the outside, a proximal portion, an intermediate portion and a distal portion. The intermediate portion projects into the chamber in a direction substantially parallel to the axis of revolution in the unloaded state.

Such tires improve behavior in use while facilitating the deformation of the sidewalls and the detachment of soil. The efficiency of the working of the land is improved.

The tire can have the following features, on their own or in combination:
- the intermediate portion and the distal portion have substantially identical and uniform thicknesses,
- the sidewall has, in cross-section according to a plane including the axis of revolution of the tire in the unloaded state, an S-shaped profile,
- the tire further comprises at least one reinforcement housed in the sole,
- the sole and the distal portion of the sidewall are substantially aligned radially, in the unloaded state,
- in a direction parallel to the axis of revolution, the sole has a width dimension that is strictly greater than the maximum distance separating the two sidewalls, in the unloaded state,
- the intermediate portion is arranged to extend towards the chamber under the effect of a radial compression, while the distal portion is arranged to extend away from the chamber under the effect of a radial compression.

According to another aspect of the invention there is proposed a rolling member for an agricultural machine. The rolling member comprises a substantially cylindrical support capable of rotating about an axis, and at least one tire as described above mounted around the support.

The rolling member equipped with such tires, for example a roller or a wheel, limits the risks of damage to the tools resulting from an accumulation of soil and debris on, around and between the tires. The presence of additional tools such as scrapers for cleaning the tires during the work becomes optional.

The rolling member can have the following features, on their own or in combination:
- the rolling member further comprises at least one spacer mounted around the support, adjacent to and in contact with the tire. The tire is kept at a distance from another tire mounted around the support,
- the support is in the form of a wheel rim around which the tire is mounted,
- the support comprises an assembly of wheel rims. The tire is mounted around at least one of the wheel rims.

BRIEF DESCRIPTION OF THE DRAWINGS

The present invention will be better understood upon reading the detailed description of several embodiments which are given by way of non-limiting examples and illustrated by the accompanying drawings, in which:

FIG. 9 is an axial cutaway view of a tire according to the invention, in the unloaded state, FIG. 10 is a detail view of FIG. 9, FIG. 11 is an axial cutaway view of a tire according to the invention, in the unloaded state, FIG. 12 is a detail view of FIG. 11, FIG. 19 is a partial cutaway schematic representation of a tire according to the invention, FIGS. 20 and 21 are each axial cutaway views of a tire according to the invention mounted on a corresponding wheel rim, FIGS. 22, 24 and 26 are axial cutaway views of tires according to the invention in a state in which they are positioned on the ground but are not loaded, and FIGS. 23, 25 and 27 are axial cutaway views of tires according to the invention in a state in which they are positioned on the ground and are loaded.

DETAILED DESCRIPTION OF THE PREFERRED EMBODIMENTS

Figure 1:
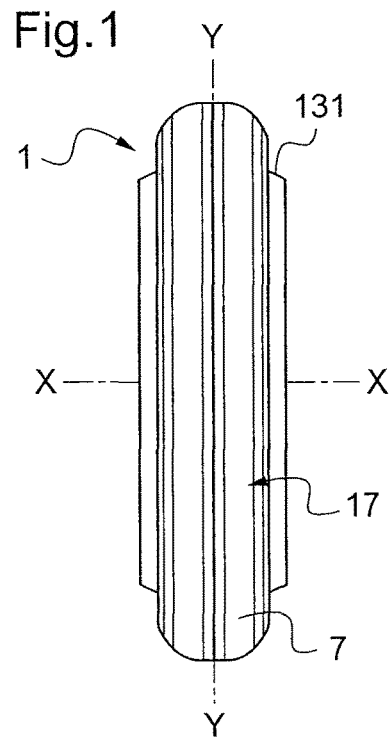
FIG. 1 is a front view of a tire according to the invention, in the unloaded state.
Figure 2:
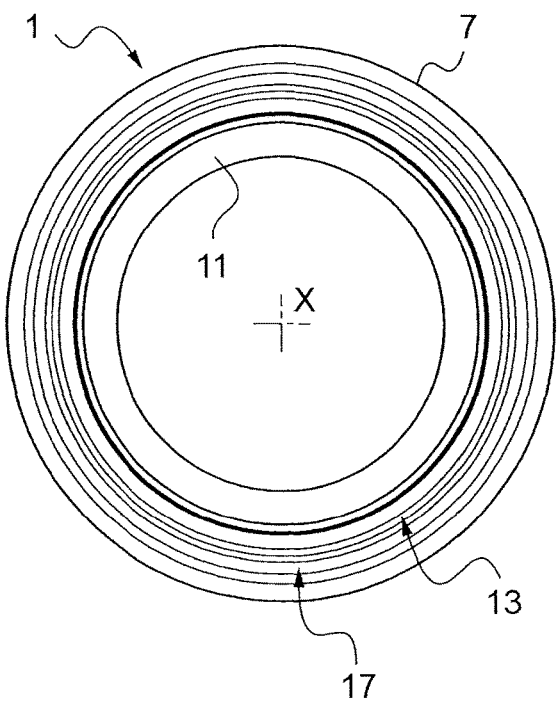
FIG. 2 is a side view of the tire of FIG. 1.
Figure 3:
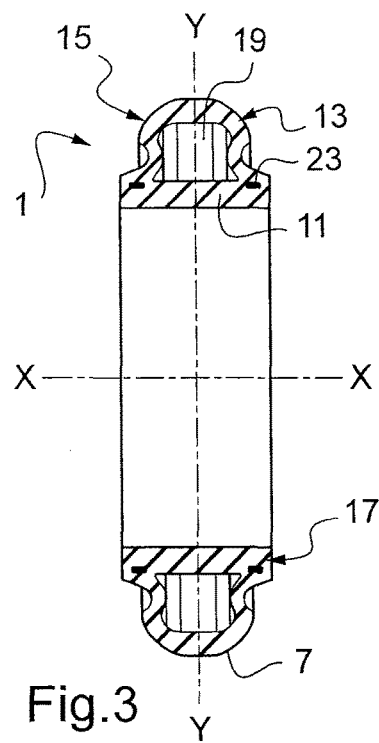
FIG. 3 is an axial cutaway view of the tire of FIG. 1.

The accompanying drawings are mainly of a certain nature and may not only serve to supplement the invention but also contribute to the definition thereof, where appropriate. It has been found that elements such as the profile geometry of pneumatic tires are difficult to define completely other than by means of the drawing.

Reference is made to the five embodiments shown here, that is to say to FIGS. 1 to 4, 5 and 6, 7 and 8, 9 and 10, 11 and 12, respectively. The tire 1 is to be mounted on an agricultural machine such as a rolling member 100 drawn and/or carried by a vehicle (not shown), for example a tractor. The expression "rolling member" denotes especially rollers and wheels, it being understood that a roller may itself comprise an assembly of a plurality of wheels.

In the examples shown here, the tire 1 is in the unloaded state. Unloaded is here understood as meaning free of external mechanical stresses, and especially that of the resistance of the ground to the weight of the agricultural machine. The tire 1 is in an undeformed state.

The tire 1 has a form of revolution according to an axis XX. In the embodiments of FIGS. 1 to 4, on the one hand, and 11 to 12, on the other hand, the tire 1 has a profile which is substantially uniform over its circumference. In variants which are not shown, the tire 1 has exceptions to the circumferential homogeneity, for example hollow and/or relief inscriptions on lateral portions of the tire 1. Such inscriptions can indicate a brand, references, sizes, etc. Furthermore, manufacturing artifacts can remain on the tire 1 in the finished state. These details are considered to be almost negligible as regards the mechanical behavior of the tire 1. The circumferential homogeneity of the tire 1 is considered to be retained.

In other embodiments, for example those shown in FIGS. 5 to 10, the tire 1 can comprise studs 3 and tread patterns 5. An orifice 21 used during vulcanization can remain, see FIGS. 7 to 10. Such studs 3, tread patterns 5 and orifices 21 constitute exceptions to the circumferential homogeneity of the tire 1.

The tire 1 further has a median plane YY perpendicular to the axis of revolution XX. In the embodiment of FIGS. 1 to 4 and in that of FIGS. 11 and 12, the median plane YY forms a plane of symmetry of the tire 1. In the embodiments of FIGS. 5 to 10, the median plane YY forms a plane of symmetry of the tire 1 with the exception of the positioning of the studs 3, the tread patterns 5 and the orifice 21.

The tire 1 has a semi-hollow profile. The tire 1 comprises a tread 7, a sole 11, and two sidewalls 13, 15. The two sidewalls 13, 15 connect the tread 7 to the sole 11. The tread 7, the sole 11 and the two sidewalls 13, 15 together form a casing 17. The casing 17 delimits a chamber 19 inside the tire 1.

The tread 7 is a wall which is arranged to come into contact with the ground during operation. The tread 7 carries the studs 3 and tread patterns 5 of the embodiments of FIGS. 5 to 10.

The sole 11, or internal wall, is a substantially cylindrical wall which is here arranged to be brought into contact with a support 101 of generally cylindrical shape belonging to the rolling member 100. The substantially cylindrical shape of the sole 11 is centred on the axis of revolution XX. In the embodiments shown here, the outer surface of the sole 11 oriented towards the axis of revolution XX, that is to say the radially inner surface, is substantially smooth.

The chamber 19 is a hollow annular space delimited by the tread 7, the sole 11 and the two sidewalls 13, 15. The hollow annular space of the chamber 19 is not inflated but is able to communicate with the ambient medium by means of the orifice 21 (visible in FIGS. 8 and 10, for example) passing through the thickness of the sole 11. The orifice 21 permitting pressure equalization during use can be that used to inject compressed air during the vulcanization step on manufacture of the tire 1, or a dedicated opening.

The presence of the orifice 21 which establishes communication between the chamber 19 and the exterior of the tire 1 allows the pressures to be equalized and facilitates the deformation of the tire 1 during operation.

The hollow annular space of the chamber 19 of a tire 1 preferably occupies a volume smaller than the volume occupied by the material constituting said tire 1.

In the examples described here, the sole 11 is mechanically reinforced by reinforcements 23, or metal cord, which are embedded in the material of the tire 1. The reinforcements 23 provide for better maintenance of the tire 1 in spite of the mechanical stresses to which it is subjected. The sole 11 has greater rigidity, better resistance than the remainder of the tire 1 during operation.

In the embodiments of FIGS. 1 to 6, there are two reinforcements 23 per sole 11. In the embodiments of FIGS. 7 to 12, there are three reinforcements 23 per sole 11. The number of reinforcements 23 is adapted according to the axial dimensions of the sole 11. The reinforcements 23 extend substantially in the circumference of the tire 1.

In the examples described here, the first sidewall 13 is the symmetrical of the second sidewall 15 relative to the median plane YY. Only the first sidewall 13 is described in detail below, see FIGS. 4, 8, 10 and 12.

Reference will be made to FIGS. 4, 8, 10 and 12, the axial section allowing the profiles of the tire to be analyzed. The sidewall 13 comprises, in this order and in succession in a direction oriented radially from the axis of revolution XX to the outside, a proximal portion 131, an intermediate portion 133 and a distal portion 135. The proximal portion 131 is connected to the sole 11. The distal portion 135 is connected to the tread 7. "Inner" here denotes the surfaces oriented towards the chamber 19, and "outer" denotes the opposite surfaces, oriented towards the outside of the tire 1, including that of the sole 11 oriented radially inwards.

As can be seen in FIGS. 4, 8, 10 and 12, the intermediate portion 133 projects into the chamber 19 in a direction substantially parallel to the axis of revolution XX. The intermediate portion 133 is concave. The proximal portion 131 and the distal portion 135 are convex. When seen from the outside of the tire 1, the intermediate portion 133 takes the form of an annular cavity which extends over the circumference of the tire 1 whereas, when seen from the chamber 19, the inside of the tire 1, the intermediate portion 133 takes the form of an annular collar which extends over the circumference of the tire 1.

The inner surface of the sidewall 13 and the outer surface of the sidewall 13 are substantially continuous. The continuity of the surfaces allows the risk of the occurrence of a stress concentration during operation to be limited. The risks of damage or rupture following deformations are limited.

In the examples described here, the intermediate portion 133 and the distal portion 135 are of substantially identical thicknesses. Furthermore, the thickness of the intermediate portion 133 on the one hand and of the distal portion 135 on the other hand is substantially homogeneous. In a variant, the thicknesses of the intermediate portion 133 and of the distal portion 135 are different.

As can be seen in FIGS. 4, 8, 10 and 12 in section along a plane comprising the axis of revolution XX of the tire 1, the sidewall 13 has an S-shaped profile. In the unloaded state, the sidewall 13 has an inflection point 130. The inflection point 130 marks the limit between the intermediate portion 133 and the distal portion 135. During use, a substantially radial force is applied to the tread 7 resulting from the weight of the agricultural machine on the ground. The tire 1 is said to be loaded. Under this action, the tread 7 and the sole 11 tend to move towards one another in the region of the point of contact with the ground. Consequently, the sidewalls 13, 15 deform.

In addition to the pure rotational movement of the tire 1 about its axis of revolution XX during use, the inflection point 130 undergoes a displacement oriented principally in a radial direction. The displacement is oriented towards the axis of revolution XX during compression and in the opposite direction during release. The axial component, that is to say parallel to the axis of revolution XX, of the displacement of the inflection point 130 is small relative to its radial component. The distal portion 135 tends to be compressed in the radial direction and to extend in the axial direction and towards the outside of the tire 1. The intermediate portion 133 tends to be compressed in a radial direction and to extend in an axial direction and towards the chamber 19.

FIGS. 22, 24 and 26 each show a tire 1 carried by a rigid support 101, in contact with the ground 90 but in a state in which no significant force is applied. FIGS. 23, 25 and 27, respectively, show the same tire 1 under the effect of a substantially uniform force applied from top to bottom to the support 101. This force is represented by the arrows F in the figures.

The embodiment of FIGS. 26 and 27 comprises stops 81 projecting into the chamber 19 from the inner surface of the sole 11. A portion of the tread 7 abuts the stops 81 when the compression of the tire 1 is considerable.

The average axial displacement of the assembly intermediate portion 133 and distal portion 135 is therefore reduced. The axial expansion, that is to say the increase in width, of the tire 1 during operation is limited. Figuratively, the sidewalls 13, 15 undergo an "accordion-like" deformation rather than extending only towards the outside during the compression. As will be described hereinbelow, this small axial expansion permits a tight juxtaposition of the tires on a rolling member 100. This combination of deformations further permits better detachment of the soil from the outer surfaces of the tire 1.

The configuration of the proximal portion 131 can differ according to the embodiments, as can be seen in FIGS. 4, 8, 10 and 12. The proximal portion 131 provides the mechanical connection between the intermediate portion 133 and the sole 11.

In the cutaway view of the embodiment of FIG. 10, the thickness of the proximal portion 131 is slightly greater than that of the intermediate portion 133 and the distal portion 135. The proximal portion 131 extends substantially radially from the sole 11. The proximal portion 131 carries an outer surface as a continuation of the axial end surface of the sole 11. When seen from the outside of the tire 1, the sole 11 and the proximal portion 131 can be confused.

Figure 4:
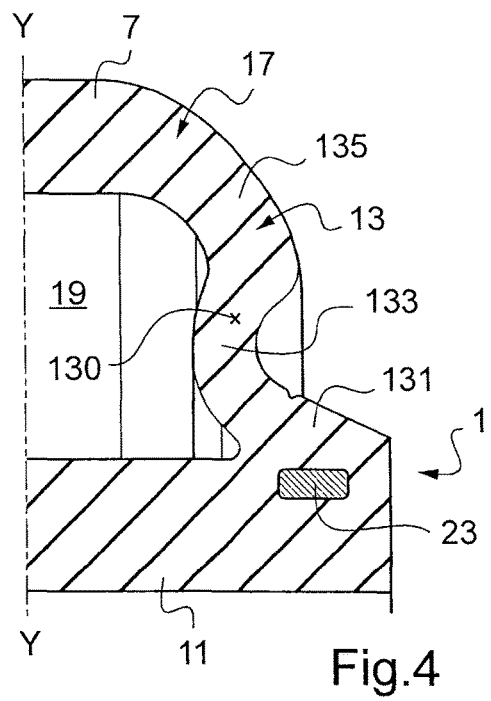
FIG. 4 is a detail view of FIG. 3.
Figure 5:
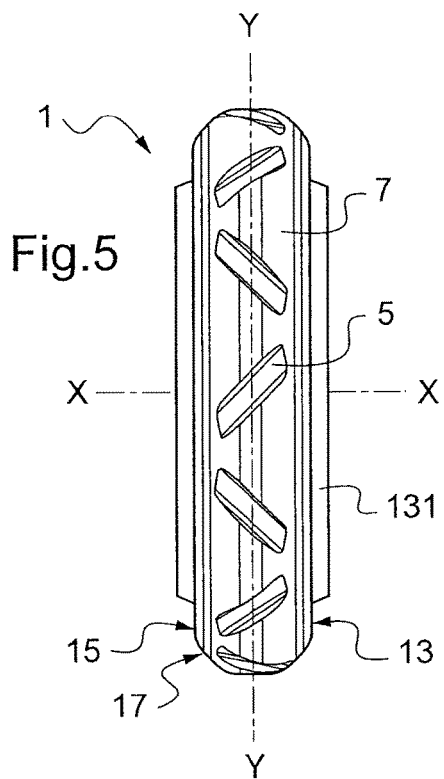
FIG. 5 is a front view of a tire according to the invention, in the unloaded state.
Figure 6:
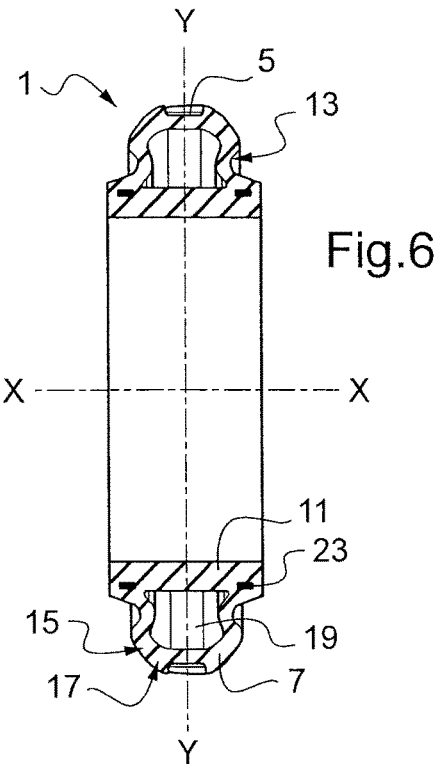
FIG. 6 is an axial cutaway view of the tire of FIG. 5.
Figure 7:
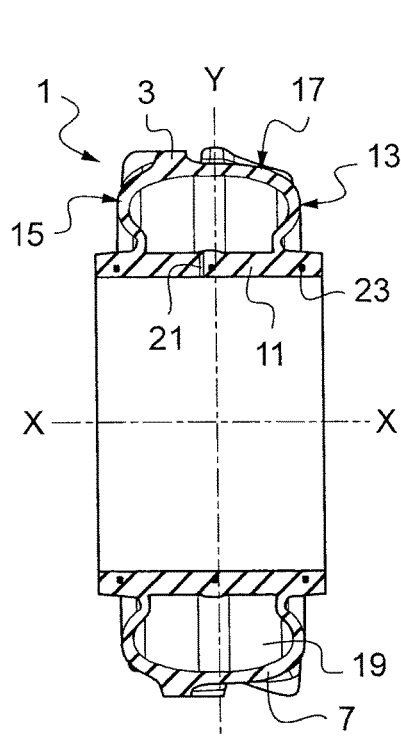
FIG. 7 is an axial cutaway view of a tire according to the invention, in the unloaded state.
Figure 8:
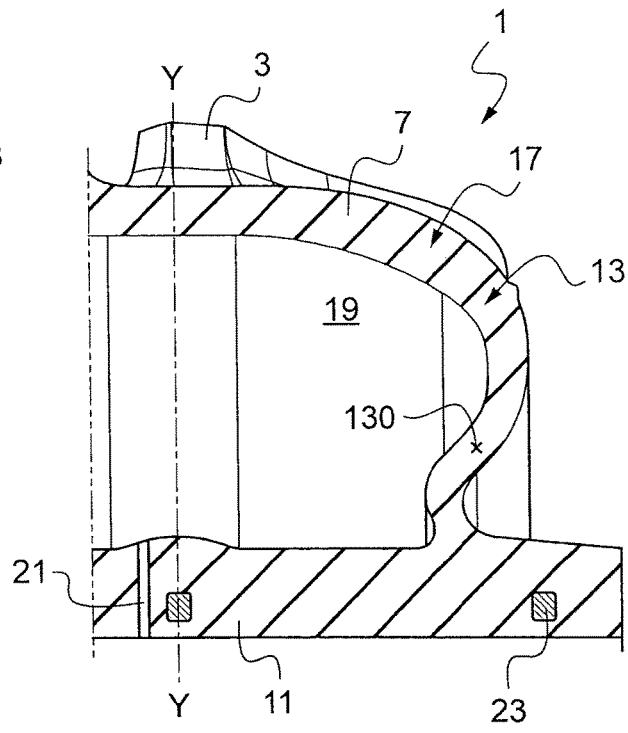
FIG. 8 is a detail view of FIG. 7.

In the embodiments of FIGS. 4, 8 and 12, the proximal portion 131 represents a small proportion of the sidewall 13. Furthermore, the outer surface of the proximal portion 131 and the axial end of the sole 11 to which it is attached are disposed at a distance from the median plane YY that is greater than the distance separating the outer surface of the distal portion 135 and the median plane YY. In other words, the width in the axial direction of the sole 11 is strictly greater than the width of the remainder of the tire 1.

The sidewall 13 of the embodiment of FIGS. 11 and 12 is similar to the sidewall 13 of FIGS. 1 to 4. The difference between the width of the sole 11 and the maximum distance separating the two sidewalls 13, 15 is greater in the embodiment of FIGS. 10 and 12 as compared with the embodiment of FIGS. 1 to 4.

In order to facilitate the detachment of the soil which tends to adhere to the tire 1, both to the tread 7 and to the sidewalls 13, 15, it is preferred for the two sidewalls 13, 15 to deform in use. The greater the displacement in the radial direction of the tread 7 relative to the sole 11, the more effective the cleaning by deformation. Furthermore, the axial dimension of the tire 1 is controlled during its use so that the deformation does not cause or causes little widening of the tire 1. In the mounted state on a rolling member 100 and juxtaposed with other tires, the axial extension of the tire 1 is limited.

The invention can be viewed as follows. Each of the two sidewalls 13, 15 carries an inner surface and an outer surface. For at least one of the sidewalls 13, 15, the part of the inner surface carried by the intermediate portion 133 is convex. The part of the outer surface carried by the intermediate portion 133 is concave. The part of the inner surface carried by the distal portion 135 is concave. The part of the outer surface carried by the distal portion 135 is convex. Said sidewall 13, 15 then has a deformation that is controlled during operation in order to facilitate the detachment of mud from the tire 1.

Another way of defining the invention is shown in FIG. 19. In an unloaded state of the tire 1 and in directions parallel to the axis of revolution XX:

the distance between the axial end surface of the sole 11 and the median plane YY is denoted X11, it being possible for this dimension also to be called the half-width of the sole 11;

the maximum distance between the inner surface of the proximal portion 131 and the median plane YY is denoted X131;

the minimum distance between the inner surface of the intermediate portion 133 and the median plane YY is denoted X133;

the maximum distance between the inner surface of the distal portion 135 and the median plane YY is denoted X135;

the thickness of the proximal portion 131 in the region of the maximum distance X131 between the inner surface of the proximal portion 131 and the median plane YY is denoted E131;

the thickness of the intermediate portion 133 in the region of the minimum distance X133 between the inner surface of the intermediate portion 133 and the median plane YY is denoted E133;

the thickness of the distal portion 135 in the region of the minimum distance X135 between the inner surface of the intermediate portion 133 and the median plane YY is denoted E135.

It then follows that, for the proximal portion 131, the intermediate portion 133 and the distal portion 135, respectively, the distance between the outer surface on the one hand and the median plane YY on the other hand corresponds to the sum of the distance between the inner surface and the median plane YY, X131, X133 and X135, respectively, to which there is added the corresponding thickness, E131, E133 and E135, respectively.

In the case of symmetry of the tire 1 relative to the median plane YY, the width of the tire 1 in the region of the various portions of the sidewalls 13, 15 is calculated by multiplying by two the distance between the median plane YY and the corresponding outer surface.

The minimum distance X133 between the inner surface of the intermediate portion 133 and the median plane YY is strictly less than the maximum distance X135 between the inner surface of the distal portion 135 and the median plane YY (X133<X135). The minimum distance X133+E133 between the outer surface of the intermediate portion 133 and the median plane YY is strictly less than the maximum distance X135+E135 between the outer surface of the distal portion 135 and the median plane YY (X133+E133<X135+E135). The minimum distance X133+E133 between the outer surface of the intermediate portion 133 and the median plane YY is strictly less than the distance X11 between the axial end surface of the sole 11 and the median plane YY (X133+E133<X11).

Preferably, the minimum distance X133+E133 between the outer surface of the intermediate portion 133 and the median plane YY is strictly less than the maximum distance X135 between the inner surface of the distal portion 135 and the median plane YY (X133+E133<X135). The inflection point 130 at the junction of the intermediate portion 133 and the distal portion 135 is situated at an axial distance X130 from the median plane YY which is between the minimum distance X133+E133 separating the outer surface of the intermediate portion 133 and the median plane YY and the maximum distance X135 separating the inner surface of the distal portion 135 and the median plane YY (X133+E133<X130<X135).

Preferably, the maximum distance X131 between the inner surface of the proximal portion 131 and the median plane YY is strictly greater than the minimum distance X133 between the inner surface of the intermediate portion 133 and the median plane YY (X131<X133). The maximum distance X131+E131 between the outer surface of the proximal portion 131 and the median plane YY is strictly greater than the minimum distance X133+E133 between the outer surface of the intermediate portion 133 and the median plane YY (X133+E133<X131+E131). The thickness E133 of the intermediate portion 133 is substantially identical to the thickness E135 of the distal portion 135 (E133=E135).

The dimensional relationships described above and shown schematically in FIG. 19 can be transposed to the embodiments shown in the preceding figures. In the case of a tire 1 that is symmetrical relative to the median plane YY, the above-mentioned dimensional relationships can be transposed to the widths of the tire 1 by multiplying the above-mentioned dimensions by two.

In general, the profile of the tires 1 according to the invention includes an intermediate radial position between the sole 11 and the tread 7 for which the casing 17 is of reduced width relative to the adjacent radial positions.

Each tire 1 is made of an appropriate flexible material. The material used may comprise either a natural rubber or one or more synthetic rubbers, or a mixture thereof. The chemical composition of the tires 1 is chosen in combination of the forms described above so that the deformation of said tire 1 on working, that is to say when rolling on the ground, permits the effective detachment of mud.

Reference will now be made to FIGS. 13 to 18. In each of the three embodiments shown, the tires 1, 99 used do not have studs 3 and tread patterns 5. The embodiments of tires 1 provided with such studs 3 and/or tread patterns 5, for example those shown in FIGS. 5 to 10, are compatible with the rolling members 100 described hereinbelow.

The rolling member 100 for an agricultural machine, here a roller, comprises a support 101 and at least one tire 1 as described above. The support 101 is substantially cylindrical and capable of rotating about an axis of rotation. In the assembled state, the axis of rotation of the support 101 is coincident with the axis of revolution XX of the tires 1, 99. The cylindrical support 101 is here provided at each of its ends with a flange 105 for providing contact with a rotary shaft.

Figure 13:
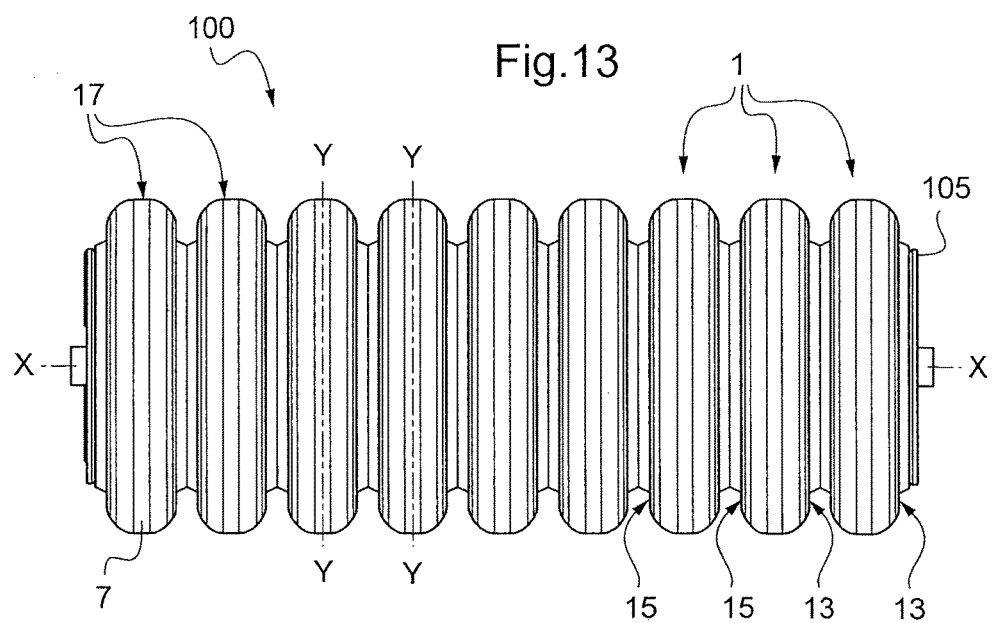
FIG. 13 is a front view of a roller comprising tires similar to that of FIG. 1.
Figure 14:
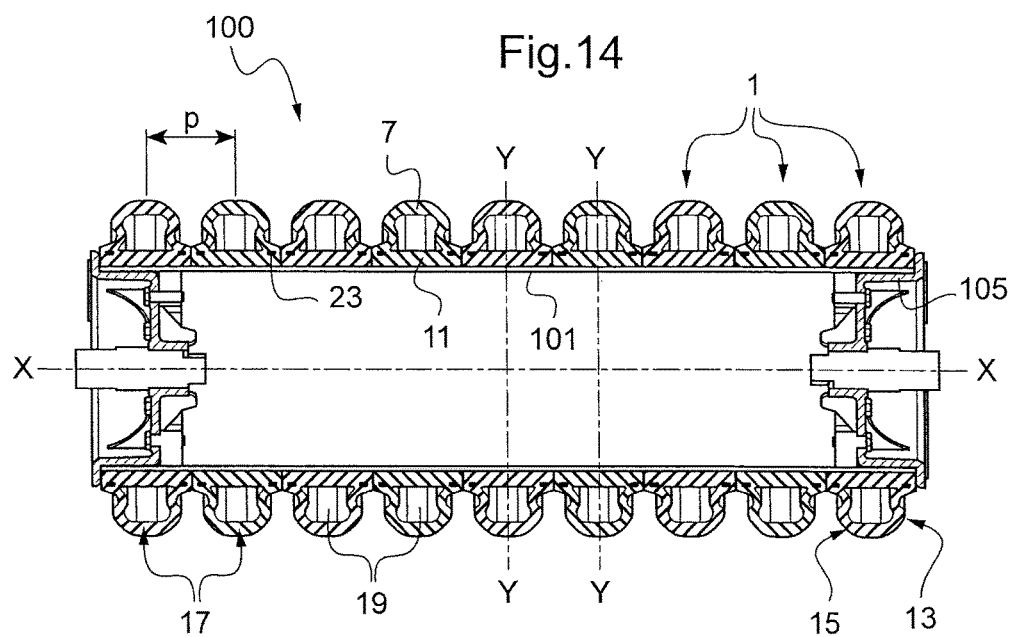
FIG. 14 is an axial cutaway view of the roller of FIG. 13.

Reference will now be made to FIGS. 13 and 14. The tires 1 are fitted in succession around the support 101. The tires 1 are mounted adjacent to and in contact with one another. In the example described here, the end of the sole 11 of a tire 1 is brought into contact with its homolog of another adjacent tire 1. The tires 1 situated at each of the ends of the roller 100 are in contact with the flange 105. The flange 105 then acts as an axial stop. In a variant, the tires disposed at each of the ends of the roller 100 can have a specifically adapted structure. For example, the end tires can exhibit antisymmetry relative to their median plane YY.

As is shown in FIG. 14, the succession of tires 1 in the axial direction XX is arranged so that the tread of the roller 100 has an elementary pattern that is repeated in the direction of the axis of revolution XX and a repetition pitch p corresponding to the "peak-to-peak" or "valley-to-valley" distance. The tires 1 can create in the ground furrows that are substantially mutually parallel and equidistant, in which furrows seeds can be sown, for example. The spacing between the centers of the furrows corresponds to the interval between each pattern and to the pitch p. In FIGS. 13 and 14, the pattern corresponds to the width of one tire 1.

The roller 100 here has a pitch p of between 60 and 250 millimeters, for example 125, 143, 150 or 167 millimeters. The value of the pitch p is chosen to correspond to the desired width between two furrows and especially according to the standard values of the field in order to adapt to other existing agricultural machines, for example sowers.

Figure 15:
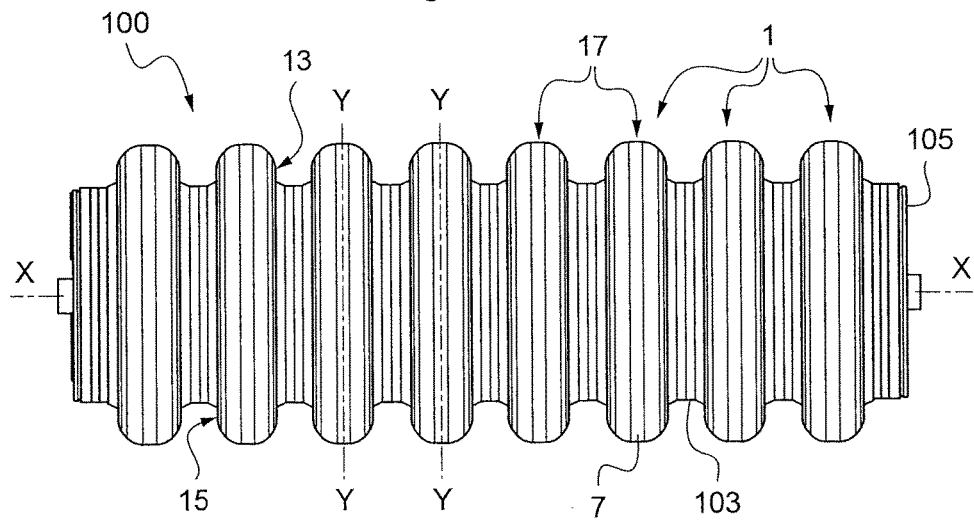
FIG. 15 is a front view of a roller comprising tires similar to that of FIG. 1.
Figure 16:
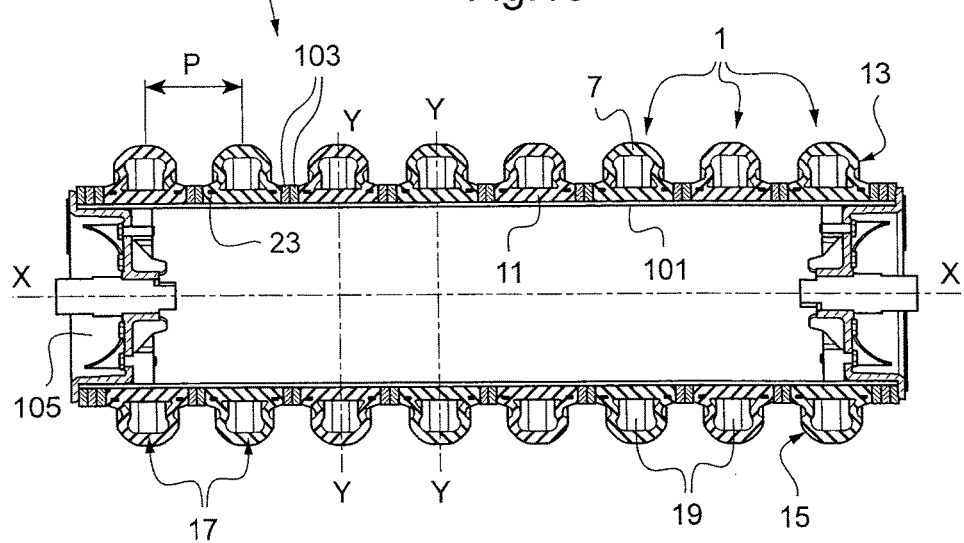
FIG. 16 is an axial cutaway view of the roller of FIG. 15.

Reference will be made to FIGS. 15 and 16. The spacing between the furrows can be adjusted by the interposition between the tires 1 of annular interposed elements of chosen width. The width of the furrows treated by the tires 1 can be chosen according to the applications in order to allow, for example, the spacing to be adjusted between two rows of sowing.

In FIGS. 15 and 16, elements in common with those of the embodiment of FIGS. 13 and 14 have been given the same reference numerals. In this embodiment, the tires 1 are mutually spaced. Spacers 103, or hoops, are mounted around the support 101 and interposed between each of the tires 1. The spacers 103 are here in the form of rings which are preferably made of a material having mechanical properties similar to those of the tires 1, for example of natural or synthetic rubber reinforced with metal insert(s). In a variant, the spacers 103 can be made of a plastics material having an elasticity which is substantially lower than that of the tires 1. The width in the axial direction and/or the number of spacers 103 between each tire 1 are chosen so that the pitch P of the roller 100 is homogeneous over the roller 100. The presence or absence of a spacer 103 with otherwise identical tires 1 allows the value of the pitch P to be chosen.

In the example shown here, two spacers 103 are interposed between each tire 1. Three spacers 103 are interposed between each end tire and the flange 105 adjacent thereto. The pitch P of the roller 100 corresponds to the sum of the width of one tire 1 and the width of two spacers 103.

Figure 17:
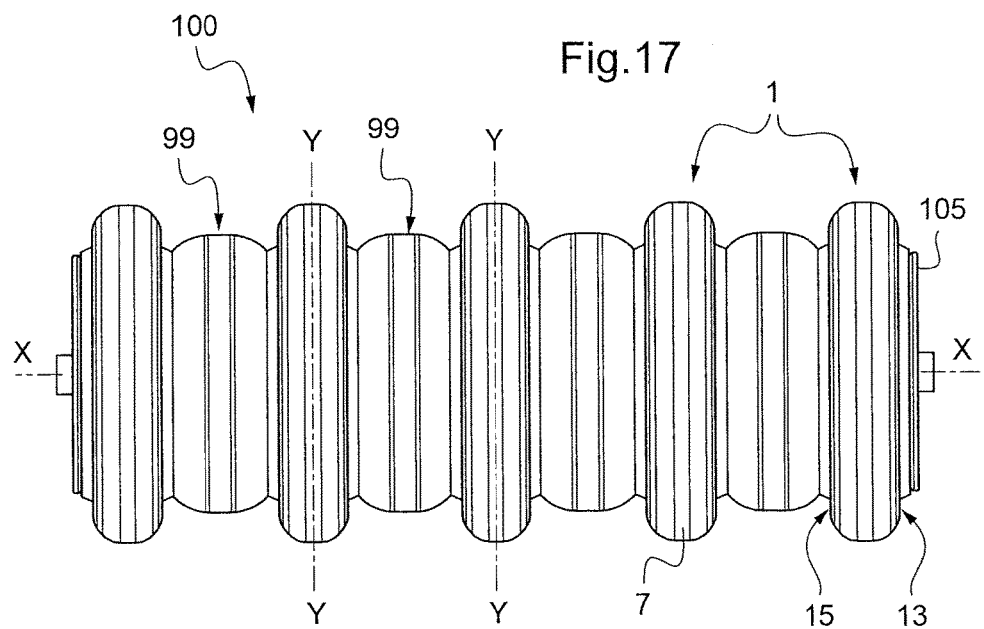
FIG. 17 is a front view of a roller comprising tires similar to that of FIG. 1.
Figure 18:
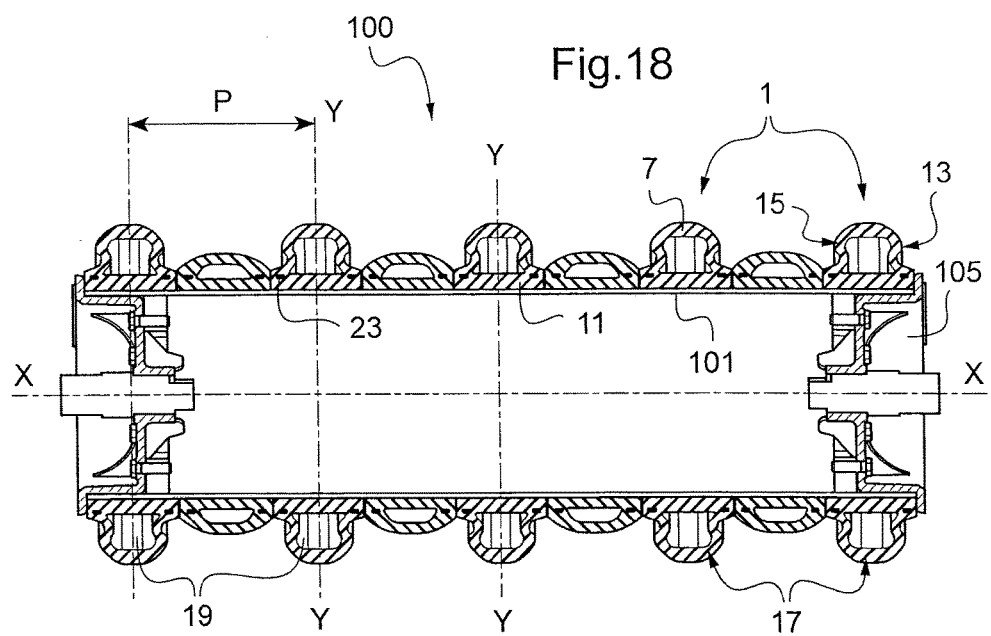
FIG. 18 is an axial cutaway view of the roller of FIG. 17.

Reference will be made to FIGS. 17 and 18. In the embodiment shown here, tires 1 as described above and different tires 99 are juxtaposed alternately in the axial direction XX of the roller 100. In the example shown here, the roller 100 is deprived of spacers 103. In a variant, spacers 103 can be used.

The pitch P of the roller 100 corresponds to the sum of the width of one tire 1 and the width of one tire 99. Depending on the form of the tires 1, 99, a plurality of furrows per pitch P, which may or may not be similar, can be created in the ground.

In an embodiment that is not shown, a roller comprising tires 1 as shown in FIGS. 11 and 12 permits the formation of two similar and parallel furrows per tire 1.

FIGS. 20 and 21 each show an embodiment of a tire 1. Parts similar to those which have already been described have been given the same reference numerals. The rolling member 100 is here a wheel. The support 101 is here a wheel rim 71. The tire 1 is mounted on the wheel rim 71. The wheel rim 71, like the support 101 of the preceding embodiments, supports the tire 1. In the example of FIGS. 20 and 21, a wheel rim 71 supports a single tire 1. In a variant, a wheel rim 71 of a wheel 100 supports a plurality of juxtaposed tires 1.

The tires 1 here comprise a bead 51 which extends radially towards the axis of revolution XX from the radially inner surface of the sole 11. The bead 51 has a shape that is complementary to a receiver 61 formed in the radially outer surface of the wheel rim 71.

The wheel rim 71 is here formed of two rings 73 and 75. The two rings 73 and 75 are of complementary shapes and are assembled on either side of the bead 51. The zone of contact between the two rings 73 and 75 corresponds substantially to the median plane YY of the tire 1. The rings 73 and 75 are held together by fixing means 77, here screws and nuts. The wheel rim 71 further comprises a generally disk-shaped plate 79 which is held between the two rings 73 and 75. The plate 79 is substantially perpendicular and centred on the axis of revolution XX.

A plurality of wheel rims 71 provided with tires 1 can be fastened to one another and/or to cylindrical supports 101. The assembly then forms a single support carrying a plurality of tires 1. The assembly provided with its tires 1 then forms a single rolling member 100.

The embodiments shown in FIGS. 13 to 18 are some examples of possible combinations of tires 1, 99 to form a roller 100 for an agricultural machine. Depending on the desired work that is to be carried out to the land, other combinations may be envisaged by the person skilled in the art.

The tires 1 of the invention can be produced in different dimensions, typically with outside diameters of between 200 and 1000 millimeters and which may be fitted around existing, standard or non-standard, supports 101 of rollers 100. For example, the supports 101 have diameters which can be between 150 and 900 millimeters.

Of course, the invention is not limited to the embodiments described above by way of examples and extends to other variants.

It will be appreciated that the precise form of the tire can be adapted according to different criteria associated with the desired use of the rolling member.

The invention can be used in particular on rollers and wheels for agricultural use, in particular on rollers for agricultural sowers, in order to permit the creation of furrows for receiving grains or seeds. These wheels and rollers can also be used for reconsolidating the soil after sowing. They can be used on their own or in combination with a sower or a soil preparing tool, which may or may not be driven.

The invention is not limited to the examples of tires and rolling members described above, only by way of example, but it includes all variants that the person skilled in the art may envisage within the scope of the following claims.

The invention claimed is:

1. A tire for an agricultural machine, said tire having an axis of revolution and comprising:
    a tread,
    a sole situated opposite the tread, and
    two sidewalls connecting the tread to the sole, wherein the tread, the sole and the two sidewalls together forming a casing defining a chamber inside the tire, wherein the chamber is in communication with the exterior of the tire via an orifice in said sole, said orifice preventing said chamber from maintaining an inflated state,
    wherein
    at least one of the sidewalls comprises, in this order and in succession in a direction oriented radially from the axis of revolution to the outside, a proximal portion connected to said sole at a radially inner boundary, an intermediate portion and a distal portion connected to said tread at a radially outer boundary, wherein in cross-section according to a plane including the axis of revolution of the tire in the unloaded state, said at least one of the sidewalls has a profile such that the intermediate portion is an axially inwardly projecting curved portion and the distal portion is an axially outwardly projecting curved portion directly connected to the axially inwardly projecting curved portion, said at least one of the sidewalls presenting an inflection point that delimitates the intermediate portion and the distal portion from each other,
    the intermediate portion projecting into the chamber in a direction parallel to the axis of revolution in the unloaded state,
    in the unloaded state of the tire in directions parallel to the axis of revolution of the tire, the minimum distance between the outer surface of the intermediate portion and the tire median plane is strictly less than the distance between the axis end surface of the sole and the tire median plane, and in the unloaded state of the tire in directions parallel to the axis of revolution of the tire, the minimum distance between the inner surface of the intermediate portion and the tire median plane is strictly less than the maximum distance between inner surface of the distal portion and the tire median plane.

2. The tire as claimed in claim 1, wherein the intermediate portion and the distal portion are of identical and homogeneous thickness.

3. The tire as claimed in claim 1, further comprising at least one reinforcement housed in the sole.

4. The tire as claimed in claim 1, wherein, in a direction parallel to the axis of revolution, the sole has a width dimension that is strictly greater than the maximum distance separating the two sidewalls, in the unloaded state.

5. The tire as claimed in claim 1, wherein each of said two sidewalls comprises said proximal portion, said intermediate portion and said distal portion and is structured such that the intermediate portion extends towards the chamber under the effect of a radial compression, the distal portion extending away from the chamber under the effect of said radial compression.

6. The tire as claimed in claim 1, wherein each of said two sidewalls comprises said proximal portion, said intermediate portion and said distal portion and each intermediate portion forms an annular collar extending over an inner circumference of said tire.

7. A rolling member for an agricultural machine, comprising a cylindrical support capable of rotating about an axis and at least one tire as claimed in claim 1 mounted around the support.

8. The rolling member as claimed in claim 7, wherein said rolling member is an agricultural roller and said at least one tire as claimed in claim 1 is at least two tires as claimed in claim 1, further comprising at least one spacer mounted around the support, adjacent to and in contact with neighboring ones of said tires, in such a manner that said tires are kept at a distance from one another.

9. The rolling member as claimed in claim 7, wherein said rolling member is an agricultural wheel and the support is in the form of a wheel rim around which the at least one tire is mounted.

10. The rolling member as claimed in claim 7, wherein said rolling member is an agricultural wheel, said at least one tire as claimed in claim 1 is at least two tires as claimed in claim 1, and the support comprises an assembly of wheel rims, each said tire being mounted around a corresponding one of the wheel rims.

11. A tire for an agricultural machine, said tire having an axis of revolution and comprising:
   a tread,
   a sole situated opposite the tread, and
   two sidewalls connecting the tread to the sole, wherein the tread, the sole and the two sidewalls together forming a casing defining a chamber inside the tire, wherein the chamber is in communication with the exterior of the tire via an orifice in said sole, said orifice preventing said chamber from maintaining an inflated state,
wherein
   at least one of the sidewalls comprises, in this order and in succession in a direction oriented radially from the axis of revolution to the outside, a proximal portion connected to said sole at a radially inner boundary, an intermediate portion and a distal portion connected to said tread at a radially outer boundary,
   the intermediate portion projecting into the chamber in a direction parallel to the axis of revolution in the unloaded state, and,
   wherein the sole and the distal portion of said sidewall are aligned radially, in the unloaded state.

12. The tire as claimed in claim 11, wherein the intermediate portion and the distal portion are of identical and homogeneous thickness.

13. The tire as claimed in claim 11, wherein said sidewall has, in cross-section according to a plane including the axis of revolution of the tire in the unloaded state, a profile with a radially inner axially inwardly projecting curved portion connected directly to a radially outer axially outwardly projecting curved portion.

14. The tire as claimed in claim 11, further comprising at least one reinforcement housed in the sole.

15. The tire as claimed in claim 11, wherein, in a direction parallel to the axis of revolution, the sole has a width dimension that is strictly greater than the maximum distance separating the two sidewalls, in the unloaded state.

16. The tire as claimed in claim 11, wherein the at least one sidewall is structured such that the intermediate portion extends towards the chamber under the effect of a radial compression, the distal portion extending away from the chamber under the effect of said radial compression.

* * * * *